United States Patent
Lin

(10) Patent No.: US 6,718,465 B1
(45) Date of Patent: Apr. 6, 2004

(54) RECONFIGURABLE INNER PRODUCT PROCESSOR ARCHITECTURE IMPLEMENTING SQUARE RECURSIVE DECOMPOSITION OF PARTIAL PRODUCT MATRICES

(75) Inventor: Rong Lin, Geneseo, NY (US)

(73) Assignee: The Research Foundation of State University of New York, Albany, NY (US)

( * ) Notice: Subject to any disclaimer, the term of this patent is extended or adjusted under 35 U.S.C. 154(b) by 0 days.

(21) Appl. No.: 09/512,380

(22) Filed: Feb. 25, 2000

(51) Int. Cl.[7] .............................. G06F 9/00; G06F 7/52; H03K 19/177
(52) U.S. Cl. ........................ 713/100; 708/607; 326/41
(58) Field of Search ........................ 713/100; 326/41; 708/607

(56) References Cited

U.S. PATENT DOCUMENTS

| | | | | |
|---|---|---|---|---|
| 5,703,802 A | * | 12/1997 | Tsubata et al. | 708/628 |
| 5,903,470 A | * | 5/1999 | Miyoshi et al. | 716/2 |
| 5,912,832 A | * | 6/1999 | Flahie et al. | 708/707 |
| 5,974,435 A | * | 10/1999 | Abbott | 708/523 |
| 6,035,319 A | * | 3/2000 | Jong | 708/628 |
| 6,323,680 B1 | * | 11/2001 | Pedersen et al. | 326/41 |
| 6,349,346 B1 | * | 2/2002 | Hanrahan et al. | 710/9 |
| 6,369,610 B1 | * | 4/2002 | Cheung et al. | 326/41 |

OTHER PUBLICATIONS

R. Lin, A. S. Botha, K. E. Kerr and G. A. Brown, "An Inner Product Processor Design Using Novel Parallel Counter Circuits" in Proc. of the first IEEE Asia–Pacific Conference on ASICS, Seoul, Korea, Aug., 1999.

S. P. Smith and H. C. Torng, "Design of a Fast Inner Product Processor", Proc. IEEE Symposium on Computer Arithmetic, 1985.

* cited by examiner

*Primary Examiner*—Thomas Lee
*Assistant Examiner*—Eric Chang
(74) *Attorney, Agent, or Firm*—Salzman & Levy

(57) ABSTRACT

A reconfigurable processor architecture based on unique square recursive order decomposition of partial product matrices is described. This architecture can be easily reconfigured by taking advantage of the locality of data that is produced by the square recursive ordering to compute the inner products of input arrays with four or more options. Each input array may contain sixty-four 8-bit items or sixteen 16-bit items or four 32-bit items or one 64-bit item, with items in either 2's-complement or unsigned form. The processor can be pipelined to output an inner product in one machine cycle, and to complete an inner product evaluation in two to four cycles, which is particularly attractive to high-speed and efficient matrix multiplication applications. The processor consists mainly of an array of 8×8 or 4×4 simple multipliers and at least one adder array.

17 Claims, 14 Drawing Sheets

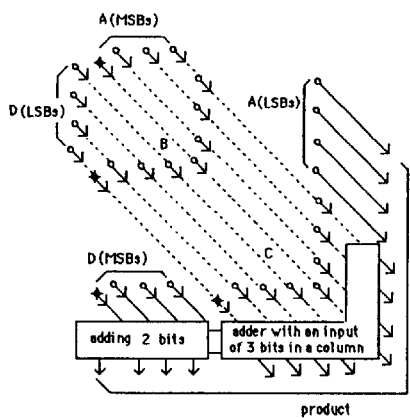
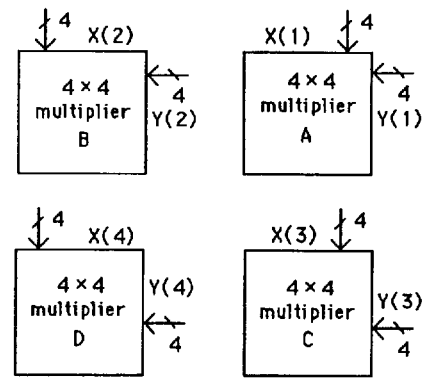
Figure 4a
Figure 4b
(a)
(b)
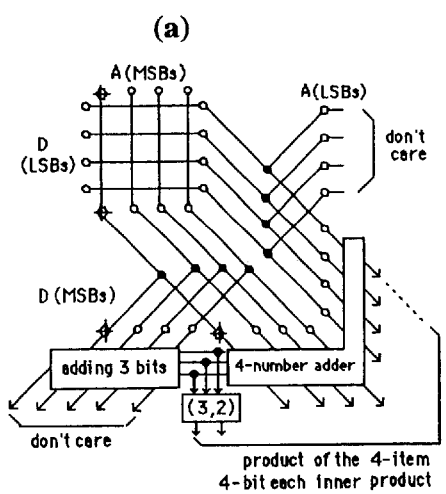
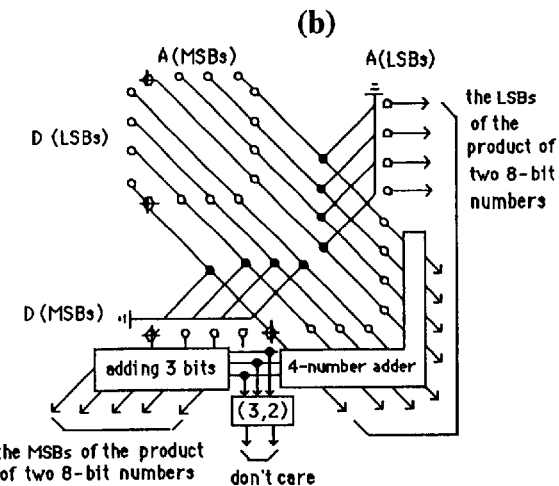
Figure 4c
Figure 4d input placement: port R0: A; port L0: B

| type # | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| type | bbb | cbb | ccb | ccc | ccf | cfb | cff | dbb | ddb | ddd | dde | ddf | deb | dee | dfb | dff | ebb | eeb | eee |

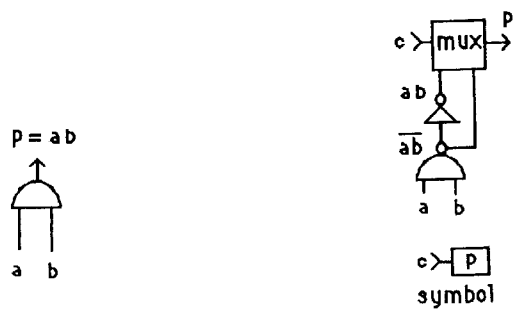
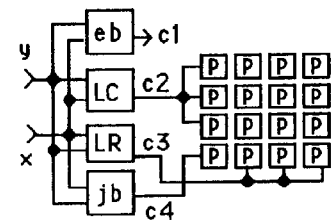
Figure 13a  Figure 13b  Figure 13c
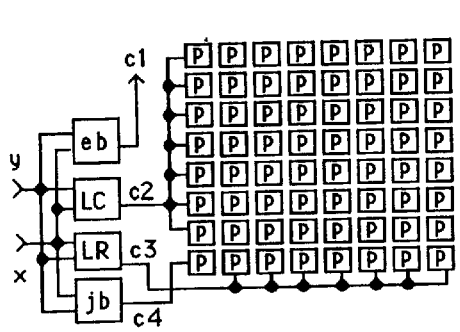
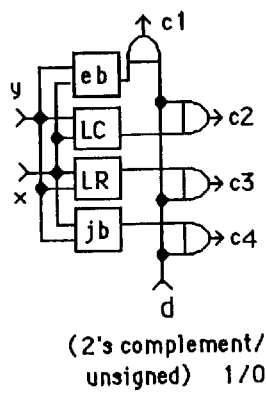
Figure 13d  Figure 13e
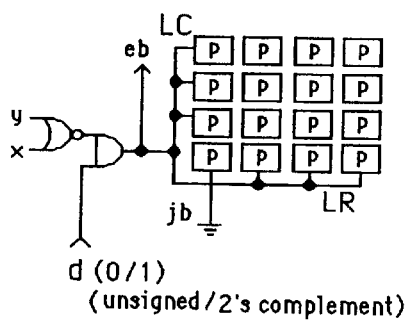
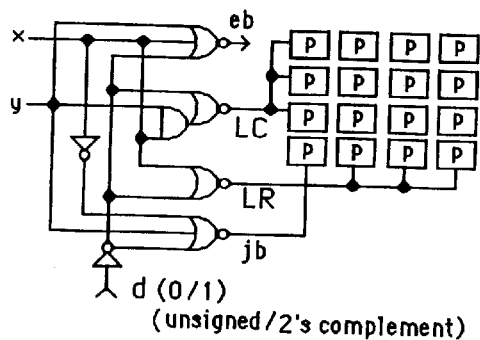
Figure 14a  Figure 14b

RECONFIGURABLE INNER PRODUCT PROCESSOR ARCHITECTURE IMPLEMENTING SQUARE RECURSIVE DECOMPOSITION OF PARTIAL PRODUCT MATRICES

FIELD OF THE INVENTION

The present invention relates to application-specific processor architectures and, more particularly, to an inner product processor architecture that is reconfigurable base upon the square recursive decomposition of partial product matrix and dynamic reconfiguration of basic multipliers and adders.

BACKGROUND OF THE INVENTION

The design of an inner product processor inevitably faces the limitation of the amount of VLSI area allowed for the processor. An excessive amount of VLSI area used for such a processor is a concern of both economy and performance. Under a restricted VLSI area, the design of such a processor often introduces a conflict between its versatility and computation speed. The multipliers used in the processor should be large in size (such as 64×64 bits), if the processor is designed to compute the inner product of two input arrays (vectors) with array item precision ranging from integer (say, an 8-bit number), to double precision (say, 64-bit) numbers. Thus, the design would sacrifice the inner product capability of the processor handling the number of items in the arrays. In other words, the array size should be small. This leads to a very inefficient application for input arrays with a large amount of lower precision items. On the other hand, if the multipliers of the processor are restricted to small size (such as 8×8 or 16×16 bits), the computation for input arrays with higher precision items will be impossible. Such a problem exists in all known inner product processor designs found in literature, including those that do not adopt a multiply/add approach, where the parameters for the number of items (N) and the number of bits (b) in each item are always fixed with an individual design. [See S. P. Smith and H. C. Torng, "Design of a Fast Inner Product Processor", Proc. IEEE Symp. on Computer Arithmetic, 1985.]

One of the objects of the present invention is to introduce novel reconfigurable inner product processor schemes which would resolve the design conflict between versatility and computation speed. Thus, it would be possible to build feasible and efficient arithmetic processors useful in most scientific and engineering applications, as also described in the applicant's copending patent application for PARALLEL VLSI SHIFT SWITCH LOGIC DEVICES, Ser. No. 09/022,248, filed on Feb. 11, 1998.

The processor of the current invention possesses the following features:

1) it can be easily reconfigured for computing inner products of input arrays with four or more types of structures. Typically, each input array may contain sixty-four 8-bit items, or sixteen 16-bit items, or four 32-bit items, or one 64 bit item, with items in 2's complement or unsigned form (i.e., with two number representation options);

2) it can be pipelined to output an inner product in one machine cycle (for example, 3 to 5 ns per cycle), and to complete an inner product evaluation in two to four cycles, which is particularly attractive to high-speed and efficient matrix multiplication applications;

3) it requires a compact VLSI area with very simple reconfigurable components. The processor consists mainly of an array of 8×8 or 4×4 simple multipliers, plus a few adder arrays of the same structure. The total amount of hardware is comparable to two 64×64 array multipliers;

4) the whole network is reconfigured using a few control bits for the desired computations, and the reconfiguration can be done dynamically, in one machine cycle. Also, each reconfiguration switch is controlled by a single bit; and 5) the design is highly regular and modular; most parts of the network are symmetric and repeatable.

The processor architecture of the current invention is based on a novel linear recursive decomposition (called square recursive decomposition) of partial product matrix and dynamic reconfigurable computation methods with particular applications on the basic multipliers and adder arrays.

SUMMARY OF THE INVENTION

In accordance with the present invention, there is provided process architecture that is reconfigurable. The reconfigurable architecture is based upon square recursive decomposition of partial product matrix and dynamic reconfiguration of basic multipliers and adders. The processor consists mainly of an array of 8×8 or 4×4 simple multipliers, plus a few adder arrays of the same structure. The total amount of hardware is comparable to two single 64×64 array multipliers. The whole architecture is reconfigured using a few control bits for the desired computations. The reconfiguration can be done in one machine cycle. Also, each reconfiguration switch is controlled by a single bit. The design is highly regular and modular. Most parts of the architecture are symmetric and repeatable.

It is an object of the present invention to provide an improved processor architecture.

It is another object of this invention to provide a processor architecture that is based on a novel linear recursive decomposition (called square recursive decomposition) of partial product matrix, and dynamic reconfigurable computation methods.

BRIEF DESCRIPTION OF THE DRAWINGS

A complete understanding of the present invention may be obtained by reference to the accompanying drawings, when considered in conjunction with the subsequent detailed description, in which:

FIGS. 4a through 4d illustrate schematic views of the reconfiguration of the multipliers, with FIG. 4a showing the weighted bits of the four products produced by the four multipliers as being added along the diagonal direction to produce the final sum of the 8×8 multiplier, FIG. 4b depicting the input data being sent to the four multipliers, FIG. 4c illustrating the state 0 of the processor (for the inner product of 4 items), and FIG. 4d showing the state 1 of the processor for the product of two numbers;

Figures 10A, 10B, 10C, 10D:
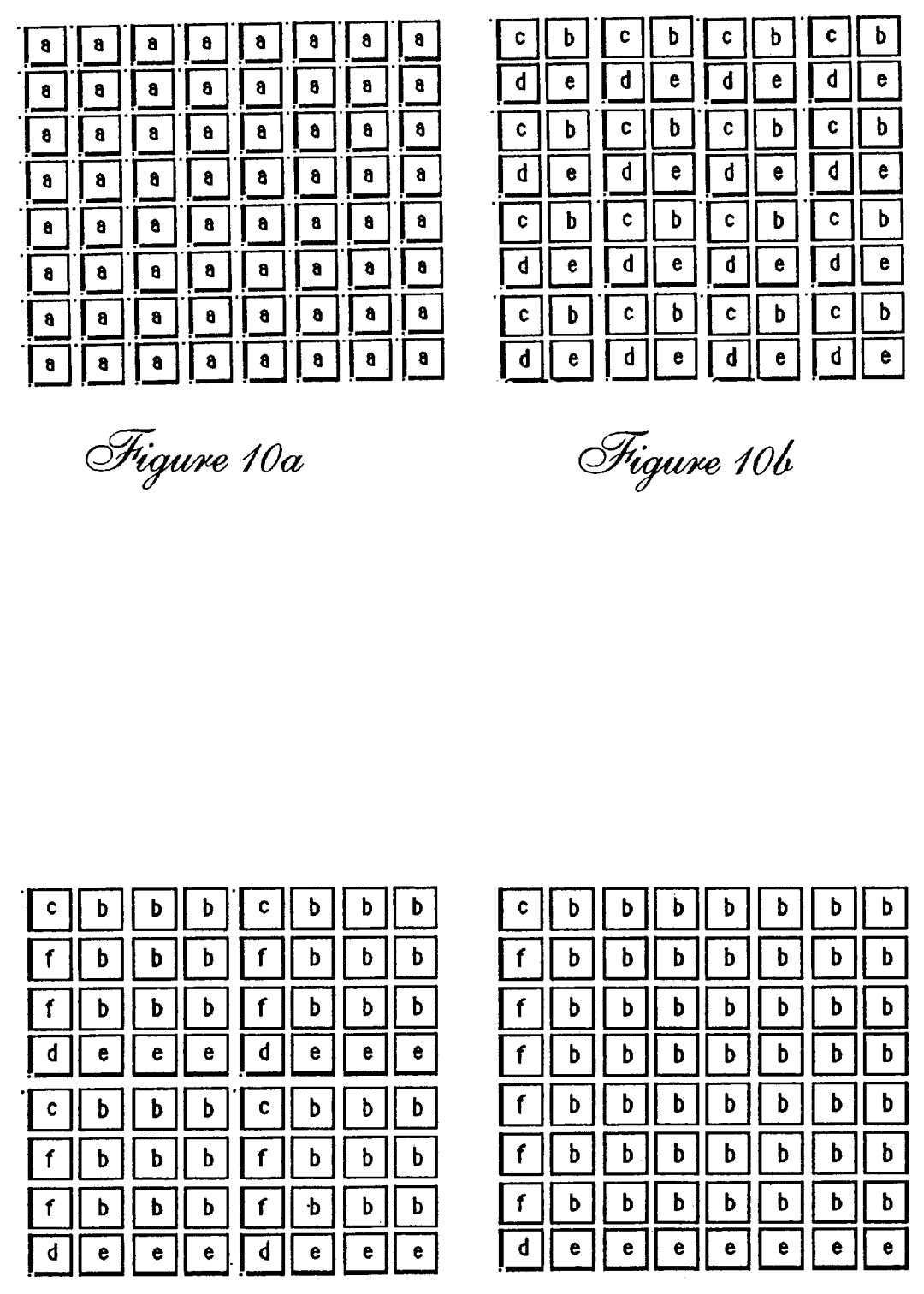

FIGS. 10a through 10d depict schematic diagrams of initial matrices formed by base-m R-multipliers for the computations of inner products of two arrays, FIG. 10a showing sixty-four 4-bit items, or sixty-four 8-bit items, xy=00, FIG. 10b depicting sixteen 8-bit items or 16-bit items, xy=01, FIG. 10c showing four 16-bit items or 32-bit items, xy=01, and FIG. 10d illustrating one 32-bit item or one 64-bit item xy=;

FIGS. 13a through 13e illustrate schematic diagrams of the reconfiguration of base-multipliers, FIG. 13a showing partial product bit p=ab, FIG. 13b depicting reconfiguration of partial product bit p controlled by c (c=0 p=ab, c=1 p=ab), FIGS. 13c and 13d illustrating partial product bits and their reconfigurable control bits produced by x and y (i.e., c1, c2, c3, c4; also see Table 1), and FIG. 13e showing the 2's complement/unsigned selection controlled by bit d;

FIGS. 14a and 14b depict in diagrammatic view the reconfiguration control circuits of R-multipliers of type (a) bbb and (b) dfb, respectively;

DESCRIPTION OF THE PREFERRED EMBODIMENT

Generally speaking, the invention features a new processor architecture based upon square recursive decomposition of partial product matrix and dynamic reconfiguration of basic multipliers and adders.

Figure 1A:
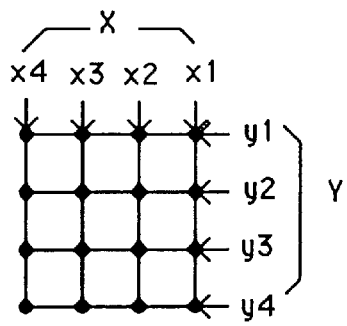
FIG. 1a shows a schematic diagram of a 4×4 partial product matrix generated by two 4-bit numbers, X and Y.
Figure 1B:
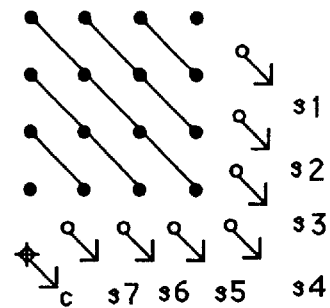
FIG. 1b depicts a schematic diagram of the product of X and Y shown in FIG. 1a, where each bit is indicated by a small circle and the carry bit by a marked circle.

Now referring to FIGS. 1a and 1b, a 4×4 partial product matrix generated by two 4-bit numbers X and Y (on a network with a matrix of AND gates), is illustrated. The product of X and Y is generated by adding all weighted partial product bits along the diagonal directions. Each bit of the final sum (the product) is then indicated by a small circle, and the carry bit by a marked circle.

Figure 2A:
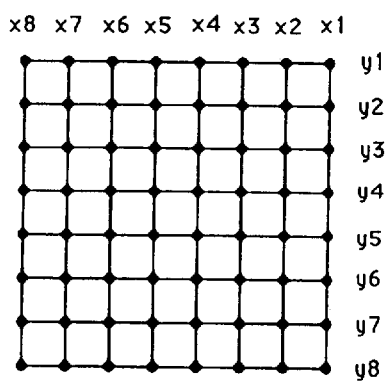
FIG. 2a illustrates a schematic diagram of an 8×8 partial product matrix.
Figure 2B:
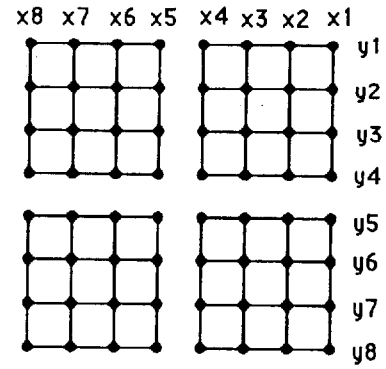
FIG. 2b shows a schematic diagram of the decomposed form of the matrix represented by four 4×4 matrices.

Referring to FIGS. 2a and 2b, an 8×8 partial product matrix is shown, which is decomposed into four 4×4 matrices. It can now be shown how to use multipliers to compute either an inner product of two 4-item arrays, each item of 4-bits or a product of two numbers, each of 8-bits. First, consider the computation of the product of two 8×8 numbers using four multipliers corresponding to the four partial product matrices. The data from two input numbers X and Y are duplicated and sent to the multipliers.

Figure 3A:
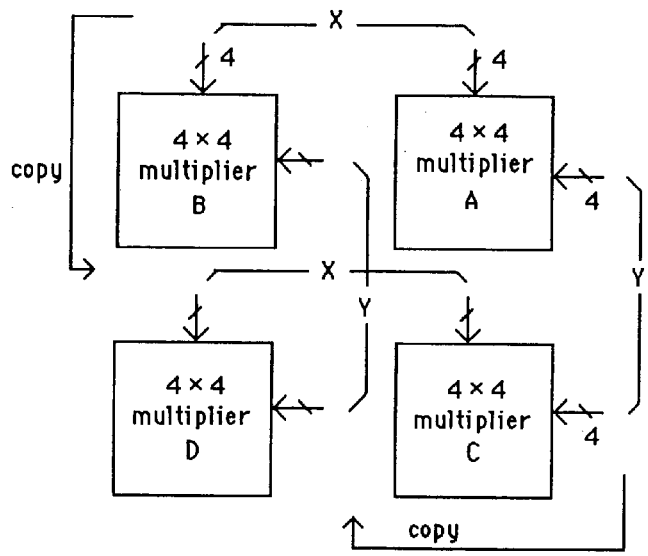
FIG. 3a depicts a schematic diagram of the multiplication of two 8-bit numbers using four 4×4 multipliers, wherein two numbers are duplicated and sent to four multipliers.
Figure 3B:
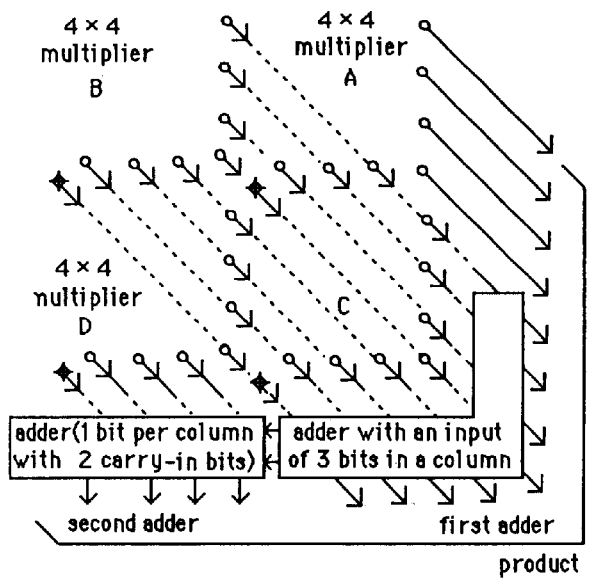
FIG. 3b illustrates a schematic diagram of the weighted bits of the four products produced by four multipliers shown in FIG. 3a, added along the diagonal direction to produce the final product of the 8×8 multiplier.

Now the weighted bits of the four products of the four multipliers are added along the diagonal direction to produce the final sum of the 8×8 multiplier by two adders, as shown in FIG. 3b. The first (or right) adder receives exactly three bits in each of its eight columns; the second receives one bit per column and two carry-in bits from the first adder. Note the regularity and simplicity of the two adders. The order of multipliers A, B, C and D shown in FIGS. 3a and 3b represents a useful order that is referred to herein as the "square order".

Next, consider the computation of inner product of two arrays of 4-items, each item of 4 bits in the (modified) network. To see how it works, first the 8×8 multiplier of FIG. 3b is re-illustrated in FIG. 4a, where the four MSBs (the four LSBs) of the products of multiplier A (D) are depicted in the new positions, i.e., the top (left) of multiplier B. When input arrays are distributed to the multipliers as shown in FIG. 4b to generate four products, the bits of the four products are added as follows: add four product bits along each connected lines as indicated in FIG. 4c in the first adder in the corresponding column. For example, four carry bits (marked circles) are connected so they are added in the last column of the first adder. In fact, every four bits with the same weight are connected, so that they are added in the first adder in the column corresponding to the weight. The processor configuration here is also referred to as state 0. It is easy to verify that the concatenation of the sum of the first adder and the sum of the three carry bits of the first adder (added by a full adder), is the desired inner product. Note that any other bit which may also produced (outputed) under the configuration will be treated as a "don't care", as shown in FIG. 4c.

Finally, consider how the modified network (FIG. 4c) can be reconfigured back to an 8×8 multiplier, assuming that the inputs are received, duplicated and distributed as shown in FIG. 3a. The processor configuration as shown is also referred to as state 1. FIG. 4d suggests that it is only necessary to connect the MSBs of A and the LSBs of D back to the diagonal directions and set the input bits from the LSBs of A and the MSBs of FIG. D, to each column in the first adder to 0. It is easy to verify that the concatenation of the following three parts forms the product of two 8-bit numbers: (1) the four LSBs of multiplier A, which directly form the LSBs of the product; (2) sum of the first adder which has four input bits in each column including a 0; and (3) the sum of the number represented by the four MSBs of multiplier D and three carry-in bits from the first adder (operated in the second adder), which form the MSBs of the product. Note that the sum of three carry-in bits is also produced by the additional full adder under the configuration, which is treated as "don't care" (see FIG. 4d).

The approach described above for decomposition of an 8×8 partial product matrix can be applied recursively for larger sized matrices. Thus, it is called square recursive decomposition.

Figures 5A, 5B, 5C, 5D, 5E:
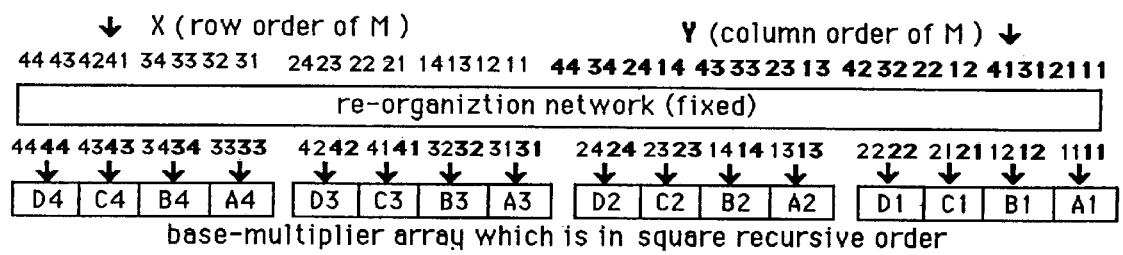
FIGS. 5a through 5e show schematic diagrams of the reconfiguration of inputs/output, with FIG. 5a depicting a 16×16 partial product matrix and corresponding sixteen 4×4 multipliers (small boxes) and duplications of two inputs, FIG. 5b showing the grouping of base-multipliers in square recursive order, FIG. 5c depicting two input arrays of 4-items, each 8-bit, FIG. 5d depicting the matrix M: with arrays of 16 items, each 4-bit, and FIG. 5e illustrating the converting of the inputs of virtual partial product matrix M to, a square recursive sequence.

Referring to FIG. 5a, a 16×16 partial product matrix and corresponding sixteen 4×4 multipliers (shown as small boxes) with two 16-bit numbers duplicated (four copies each and distributed to the multipliers), is shown. Two digits denote a 4-bit number as a part of an item of array X (or array Y), which is received by a 4×4 multiplier as a horizontal (or vertical) input. The left (right) digit denotes the X(Y) array index of the item; the other digit denotes the relative position of the four bits in the item. For example, 11 represents four LSBs of item 1 of array X (or Y); 12 represents the second four LSBs of item 1 of X or the four LSBs of item 2 of Y, depending on the row or column input it represents. If each item of the input array contains only four bits, both 2-bits are used to denote array index for up to 64 items in 2-D form. The ordered 2-digit pair uv, where u=[i/4], v=(i−1) MOD 4+1, represents an input array item, either X(i) or Y(i) (for 1#i#64) depending on the row, or column, the 2-digit represents.

The recursive reconfigurations are as follows. First, each 4×4 multiplier produces its product; then every four 4×4 multipliers are grouped according to the square recursive order, as shown in FIG. 5b (dotted boxes). Each group forms an 8×8 multiplier, producing a product of 16 bits, for which all switches need be set to state 1 (refer to FIG. 4d). It is easy to see that the reconfiguration mechanism, shown in FIGS. 4c and 4d, is not restricted to four 4×4 multipliers. Clearly, it works the same way for multipliers of four 8×8 or four 16×16, etc. For that purpose, it is necessary only to add more lines, switches and adders correspondingly, while using the same general structure recursively. So, with one more stage of reconfiguration on these 8×8 multipliers (dotted boxes), and by setting switches to state 1, the 16×16 product can be produced.

Now, two input arrays of 4-items are distributed, each 8-bit to the network (with duplication of two copies each), as shown in FIG. 5c. The switches of the first stage are set for state 1, and then switches of the second stage are set for state 0. Clearly, the final result is the inner product of these two input arrays. Finally, two input arrays of 16-items are distributed, each 4-bits (without duplication) to the network, as shown in FIG. 5d. Note that in this figure, each 2-digit pair represents an array item index, as described hereinabove. Switches are set in both two stages to state 0. Clearly, the final result is the inner product of two arrays of 16-items, each 4-bits.

The matrices constructed by base-4 multipliers, as shown in FIGS. 5a through 5e, are called (initial) virtual partial product matrices.

The two initial input arrays X and Y should be placed in M, as shown in FIGS. 5a, or 5c, or 5d, according to input options, and may be duplicated in row (for X) and column (for Y) directions. Then, the row and column ordered sequences of X and Y items are converted into a sequence in square recursive order (FIG. 5e). For that purpose, a placement/duplication network and a fixed permutation (conversion) network are provided, shown hereinafter.

The Inner Product Processor Architecture

Referring to FIGS. 6a through 6f, an overall reconfigurable inner product processor architecture based on the decomposition approach described above, is illustrated. The processor architecture consists of three parts: input array placement/duplication and (linear) re-arrangement networks, the base-multiplier (8×8 here) arrays (reconfigurable for number representations), and the three stages of reconfigurable adder arrays. The input options for the inner products of two arrays are with sixty-four 8-bit items, sixteen 16-bit items, four 32-bit items, and one 64-bit item.

Figure 6A:
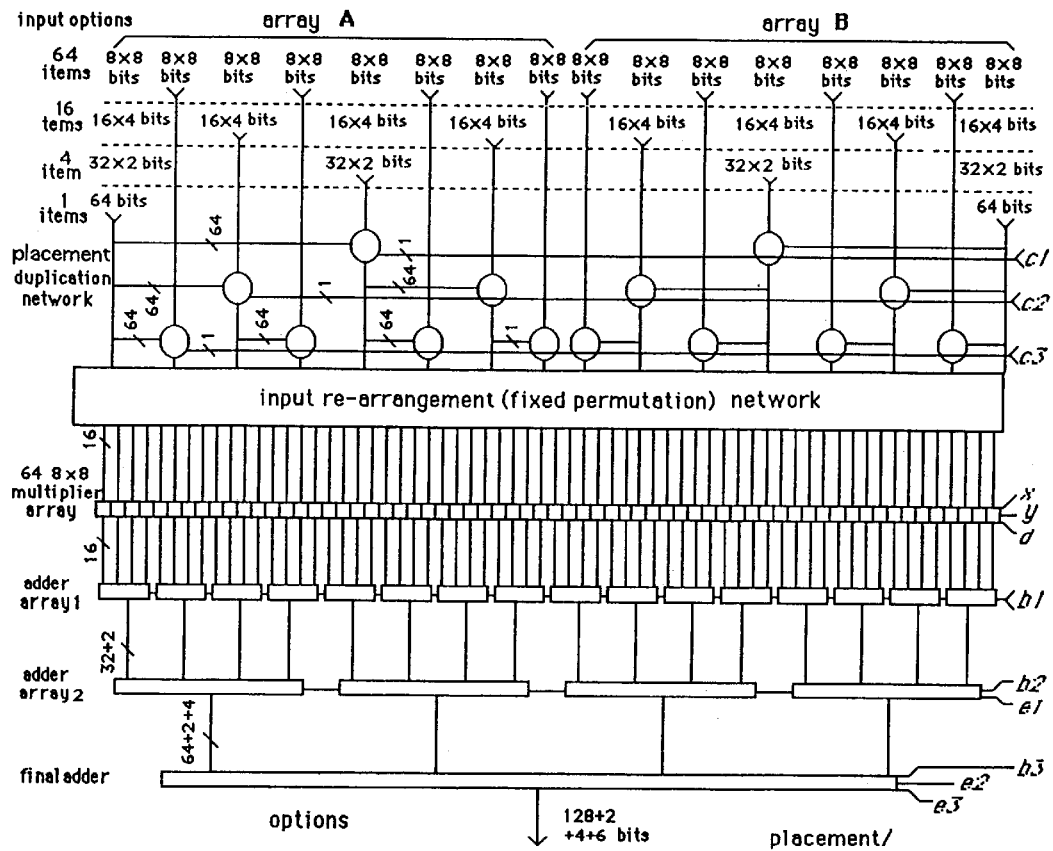
FIGS. 6a through 6f show a schematic view of the base-8, size-64 reconfigurable inner product processor, with FIG. 6a depicting the overall organization, FIG. 6b showing the structure of duplication switch, FIGS. 6c, 6d, 6e and 6f illustrating the input array placements with respect to the options for each of arrays A and B: that for FIG. 6c being one 64-bit item, that for FIG. 6d being four 32-bit items, that for FIG. 6e being sixteen 16-bit items, and that for FIG. 6f being sixty-four 8-bit items.
Figure 6B:
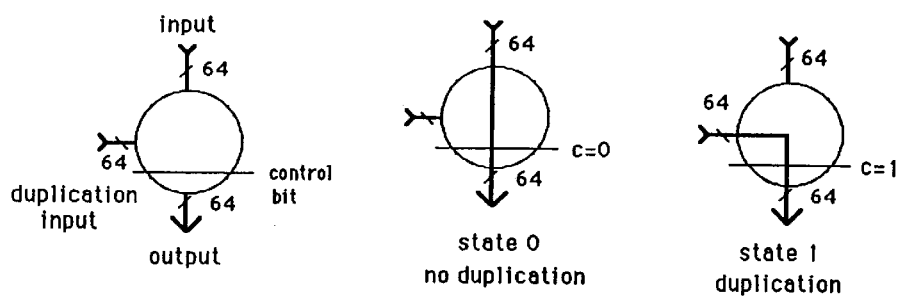
Figure 6C:
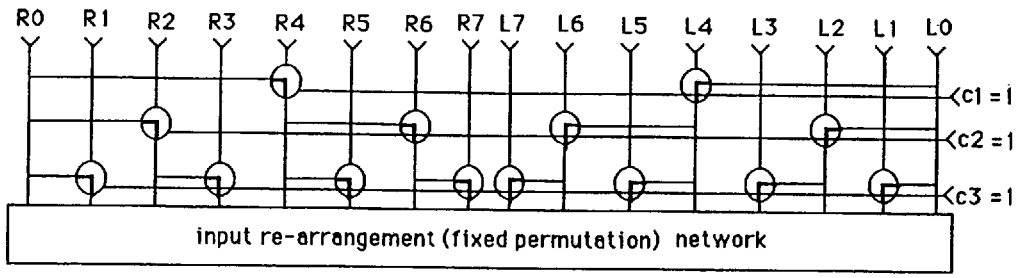
Figure 6D:
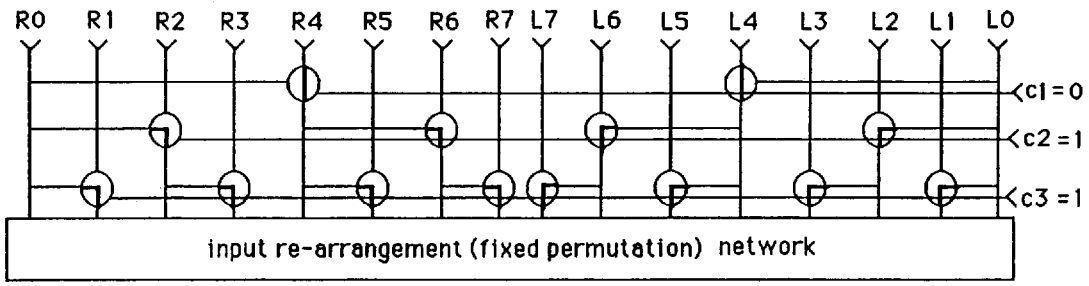
Figure 6E:
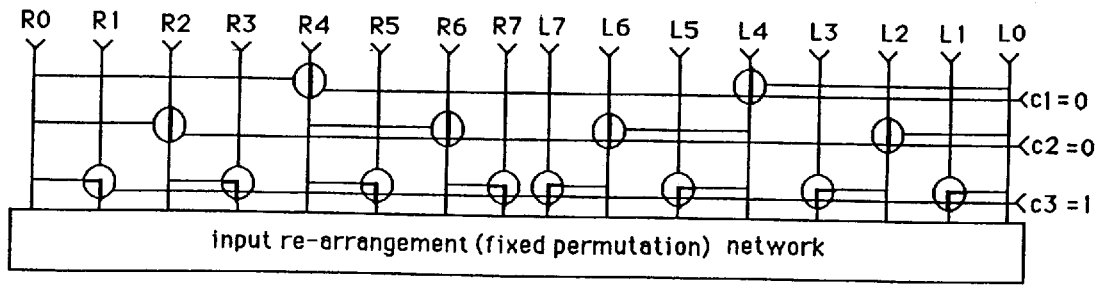
Figure 6F:
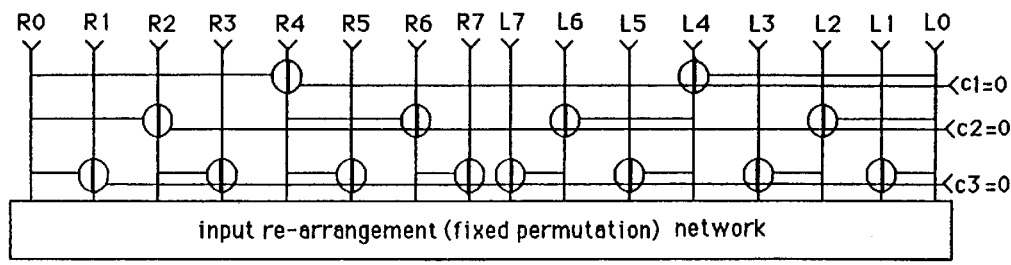

The input arrays A and B are placed in specified ports and duplicated as follows. If the inputs are two 64-bit numbers, they should be placed in the ports R0 (for A) and L0 (for B), as shown in FIG. 6c, and all duplication switches are set to state 1 (for duplication). Three levels of the binary-tree duplication network make a total of eight copies for each of the two arrays, one copy per bus (of 64 bits), with array A copies in the left half, array B copies in the right half, which are all automatically placed by the switches. If the inputs are two arrays, each with 4-items of 32 bits, they should be placed in the four buses as shown in FIG. 6d, and all duplication switches should be set to state 1, except the top level (two) switches, which are in state 0 for simple pass. Two levels of the binary-tree duplication make a total of four copies for each array, one copy (with 2 array items) per bus. Two other input options (for 16-items of 16-bit and 64-items of 8-bit) are handled correspondingly, as shown in FIGS. 6e and 6f. There is no duplication for the option shown in FIG. 6d.

Figure 7:
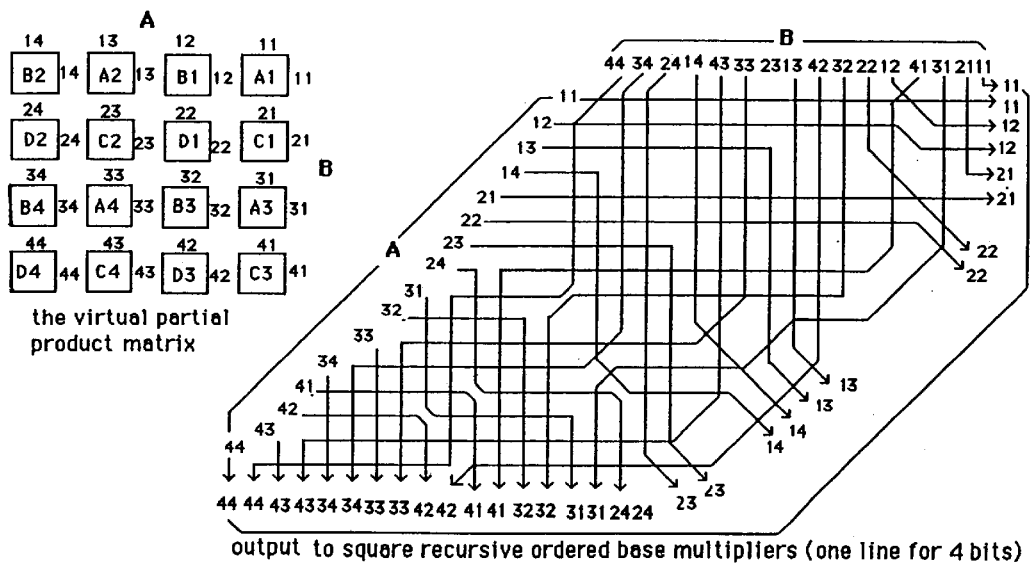
FIG. 7 illustrates a schematic diagram of the permutation network for a base-4, size-16 reconfigurable inner product processor (each line represents four bits)
Figure 8:
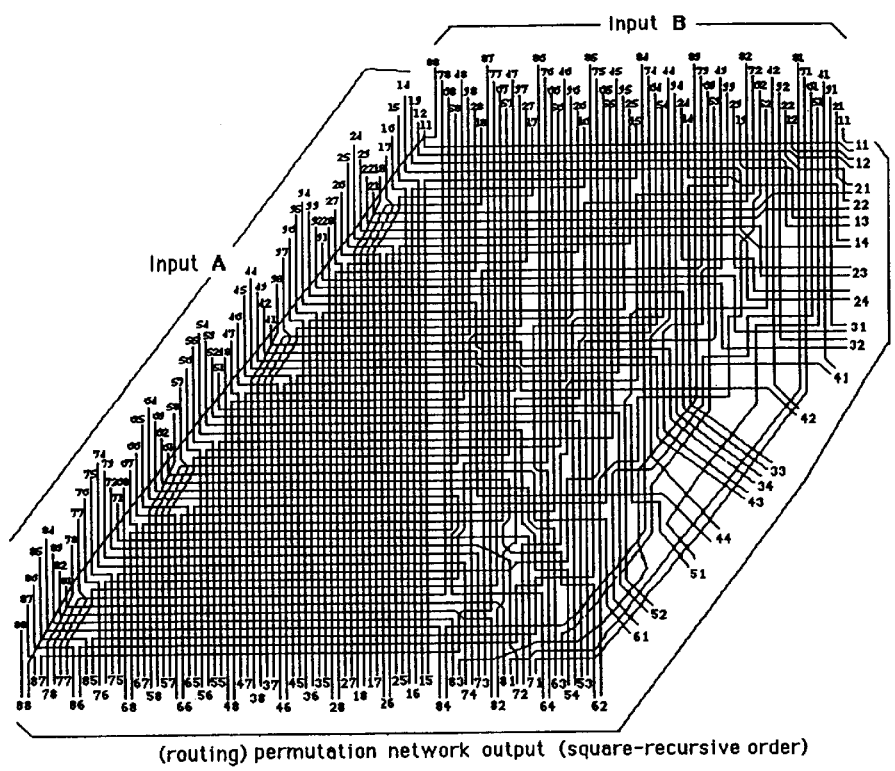
FIG. 8 depicts a schematic view of the permutation network for base-8, size-64 reconfigurable inner product processor.

The input data are now re-arranged by a (fixed) permutation network from the row and column orders of the virtual matrix to the square recursive orders. The permutation networks for base-4, size-16 and base-8, size-64 inner product processors, are shown in FIGS. 7 and 8, respectively.

After permutation, the input data in correct order are received by each 8×8 base-multiplier, which can be pre-(but fast) reconfigured for two input number representations (2's complement and unsigned) and for four input array options by a total of three control bits (x, y and d). The products of 8×8 multipliers then go through three stages of reconfigurable adder arrays, including the final adder to generate the desired final product (FIGS. 6a through 6f). More detailed adder array reconfigurations are illustrated by examples shown hereinafter.

The Reconfigurable Base-Multipliers

To fit the proposed processor for computing an inner product of two arrays with signed numbers represented in 2's complement form, it is necessary only to use a few types of base multipliers which can be reconfigured simply by two input array structure option bits x and y.

Figure 9:
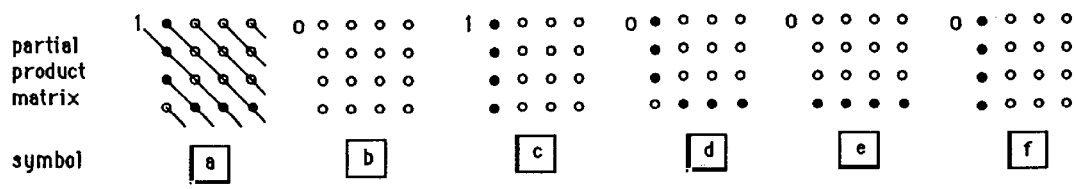
FIG. 9 shows a schematic view of the six types of modified partial product matrices of m by m (here m=4)

Referring to FIG. 9, six types of modified partial product matrices are shown of m by m. Note that m=4 as an example, but m can be 8, or any desired small integer. A small circle represents a partial product, and a dot represents the complement of a partial product. An extra bit of 1 or 0 is also generated along with each matrix as the MSB of the first row. The weighted addition of bits along diagonal direction (as shown for type a) produces a number which is, or is a part of, the product of a 2's complement multiplier. These base-multipliers are also referred to as base-m R-multipliers. It should be noticed that the partial product matrix of a 2's complement array multiplier for two input numbers of 4-bits, is exactly the one shown in FIG. 9a. [See C. R. Baugh and B. A. Wooley, "A Two's Complement Parallel Array Multiplication Algorithm" IEEE Tran. on Computers, Vol. C-22, pp. 1045–1047, 1973.]

With six types of base-4 R-multipliers, the desired four types of initial virtual matrix of 32 by 32 bits can be constructed, as shown in FIGS. 10a through 10d. Clearly, the matrices of (a), (b), (c) and (d) are for the computations of the inner products of two arrays, each with sixty-four 4-bit items, sixteen 8-bit items, four 16-bit items, and one 32-bit item, respectively. All input items are in 2's complement form.

Figures 11, 12:
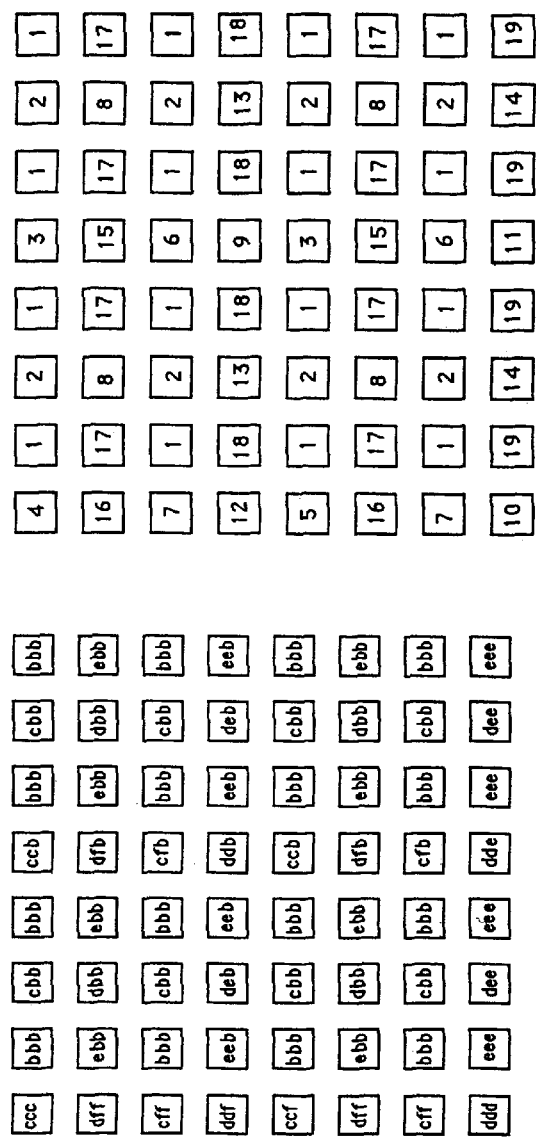
FIG. 11 illustrates, in tabular form, reconfigurable base R-multiplier types, where a reconfigurable base R-multiplier of a specific type, say uvw, is defined as: for reconfiguration control bits x and y, with xy values of 00, 01, 10, and 11, the multiplier's partial product matrix are reconfigured to a, u, v, and w types.
FIG. 12 shows, in tabular form, the reconfiguration types and type numbers for all of the 64 base R-multipliers.

Now, it is possible to describe how to construct base-m R-multipliers, such that they can be reconfigured for four types of computations (as shown in FIGS. 10a through 10d), according to input array structure option bits (or control bits) x and y. Examine the base-4 (or 8) R-multiplier on the right top corner (or at row 1 column 1). It can be seen that this R-multiplier should be reconfigured to type "a" when xy=00, to type "b" for all other values of xy. Similarly, the multiplier at row 2 column 4, should be reconfigured to types "a", "d", "f", "b" for xy values of 00, 01, 10 and 11, respectively. With a careful examination for all 64 base R-Multiplier reconfiguration structures, they can be reduced to a total of nineteen types of basic structures for all possible reconfigurations, as shown in FIG. 11. The types of all sixty-four base-4, size-32, or sixty-four base-8, size-64 multipliers are shown in FIG. 12.

It turns out that the realization of these reconfigurations is quite simple. It is easy to see from FIG. 9 that the bits whose values are subject to change in a base-multiplier partial product matrix are restricted to those on the last column and the last row of the matrix, and an extra bit, i.e., the MSB of the first row.

Referring to FIGS. 13a through 13e, the additional hardware necessary to allow a base-multiplier to become an Rmultiplier, is illustrated. FIG. 13a shows a general partial product bit p which is expressed as ab. FIG. 13b shows reconfigurable partial product bit generation circuits and reconfiguration control bit c (note: c=0, p=ab, c=1, p=ab).

FIGS. 13c and 13d show all reconfigurable partial product bits of 4×4 and 8×8 base multipliers and their controls bits, i.e., c1, c2, c3, c4. The control bits are produced by control circuits: eb (for extra bit), LC (for last column), LR (for last row) and jb (for the joint bit of the last row and the last column), where bits x and y are two of input structure option control bits, or two reconfiguration bits. FIG. 13e illustrates a circuit structure with the number representation select bit d which is ANDed to each control bit, such that the base R-multipliers can be set to unsigned or 2's complement by setting d value to 0 or 1, correspondingly. It is easy to verify that eb, LC, LR and jb of each base R-multiplier comprise only a few simple combinational circuits, whose logic expressions are summarized in Table 1. The reconfiguration components of R-multipliers of type bbb (#1) and type dfb (#15), are illustrated in FIGS. 14a and 14b.

TABLE 1

Control Circuits of the Reconfigurable Base R-multipliers

| | Base R-Multiplier | | | | | | | | | | | | | | | | | | |
|---|---|---|---|---|---|---|---|---|---|---|---|---|---|---|---|---|---|---|---|
| type # | 1 | 2 | 3 | 4 | 5 | 6 | 7 | 8 | 9 | 10 | 11 | 12 | 13 | 14 | 15 | 16 | 17 | 18 | 19 |
| type | bbb | cbb | ccb | ccc | ccf | cfb | cff | dbb | ddb | ddd | dde | ddf | deb | dee | dfb | dff | ebb | eeb | eee |
| xy | Structures | | | | | | | | | | | | | | | | | | |
| 00 | a | a | a | a | a | a | a | a | a | a | a | a | a | a | a | a | a | a | a |
| 01 | b | c | c | c | c | c | c | d | d | d | d | d | d | d | d | d | e | e | e |
| 10 | b | b | c | c | c | f | f | b | d | d | d | d | e | e | f | f | b | e | e |
| 11 | b | b | b | c | f | b | f | b | b | d | e | f | b | e | b | f | b | b | e |
| | Reconfiguration Control Circuits | | | | | | | | | | | | | | | | | | |
| sb | $\overline{x+y}$ | $\overline{x}$ | $\overline{xy}$ | 1 | $\overline{xy}$ | $\overline{x}$ | $\overline{x}$ | $\overline{x+y}$ | $\overline{x+y}$ | $\overline{x+y}$ | $\overline{x+y}$ | $\overline{x+y}$ | $\overline{x+y}$ | $\overline{x+y}$ | $\overline{x+y}$ | $\overline{x+y}$ | $\overline{x+y}$ | $\overline{x+y}$ | $\overline{x+y}$ |
| LC | $\overline{x+y}$ | $\overline{x}$ | $\overline{xy}$ | 1 | 1 | $\overline{xy}$ | 1 | $\overline{x}$ | $\overline{xy}$ | 1 | $\overline{xy}$ | 1 | $\overline{x}$ | $\overline{x}$ | $\overline{xy}$ | 1 | $\overline{x+y}$ | $\overline{x+y}$ | $\overline{x+y}$ |
| LR | $\overline{x+y}$ | $\overline{x+y}$ | $\overline{x+y}$ | $\overline{x+y}$ | $\overline{x+y}$ | $\overline{x+y}$ | $\overline{x+y}$ | $\overline{x}$ | $\overline{xy}$ | 1 | 1 | $\overline{xy}$ | $\overline{xy}$ | 1 | $\overline{x}$ | $\overline{x}$ | $\overline{x}$ | $\overline{xy}$ | 1 |
| jb | 0 | $\overline{xy}$ | $x \oplus y$ | $x + y$ | $x + y$ | $x \oplus y$ | $x + y$ | 0 | 0 | 0 | $xy$ | $xy$ | $xy$ | $x$ | $\overline{xy}$ | $x$ | $\overline{xy}$ | $x \oplus y$ | $x + y$ |

The input array structure option bits x and y are set to 00 or 01 or 10 or 11, if each of the two input arrays has sixty-four 8-bit items, or sixteen 16-bit items, or four 32-bit items, or one 64-bit item.

The Architectures of the Adder Arrays

The three adder arrays shown in FIGS. 6a through 6f have a common feature: there are exactly four input bits in each column of the first part of each adder. (Also, refer to FIGS. 4a through 4d, which is realized in FIGS. 6a through 6f, and detailed in FIGS. 17 and 18.) The amount of hardware and the delay of such an adder is mainly determined by its first part, whose size is referred to as main size of the adder. For a base-8, size-64 inner product processor, all required adders consist of one with main size 64, four with main size 32, and sixteen with main size 16.

Many available techniques can be applied to implement such adders, and the design can be simplified due to the regularity.

Figure 15:
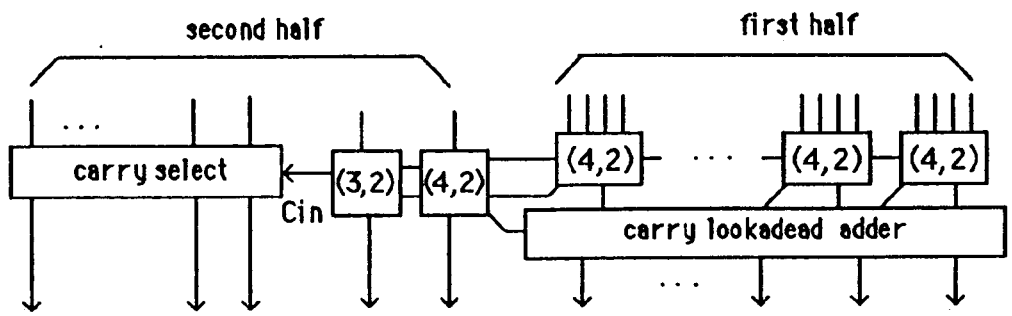
FIG. 15 illustrates a schematic diagram of the general implementation of the adders of the inner product processor.

Referring to FIG. 15, a general implementation of such an adder is illustrated.

Figure 16:
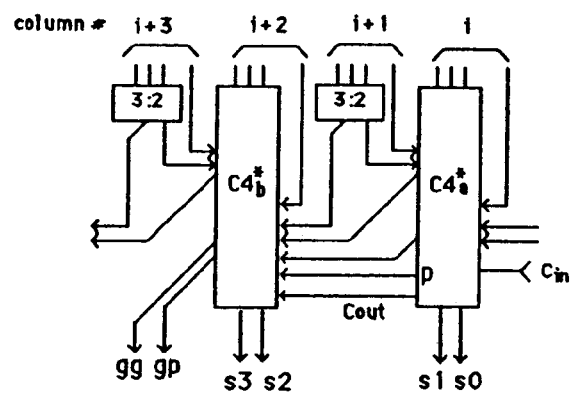
FIG. 16 shows a schematic view of the group of 4-columns of a shift switch final adder.

Referring to FIG. 16, a group of 4 columns of the adder, where the group carry generate/propagate, gg and gp are produced directly through utilizing two shift switches C4*a and C4*b, is shown. The shift switches reduce the carry propagation stages needed, thus achieving better performance in speed, compactness and, particularly, in power dissipation.

Figure 17:
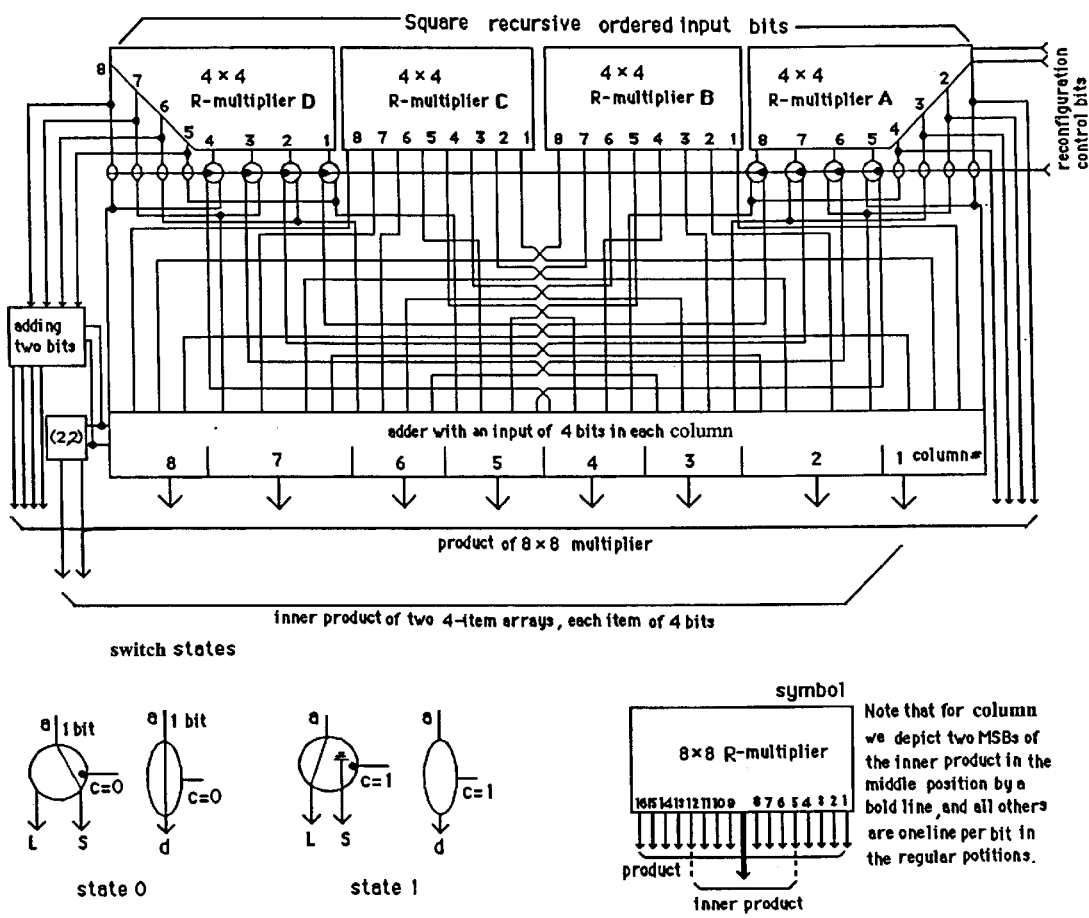
FIG. 17 depicts a schematic view of a base-4, size-8 inner product processor, with the implementation of the first stage of the reconfiguration of the adder array.
Figure 18:
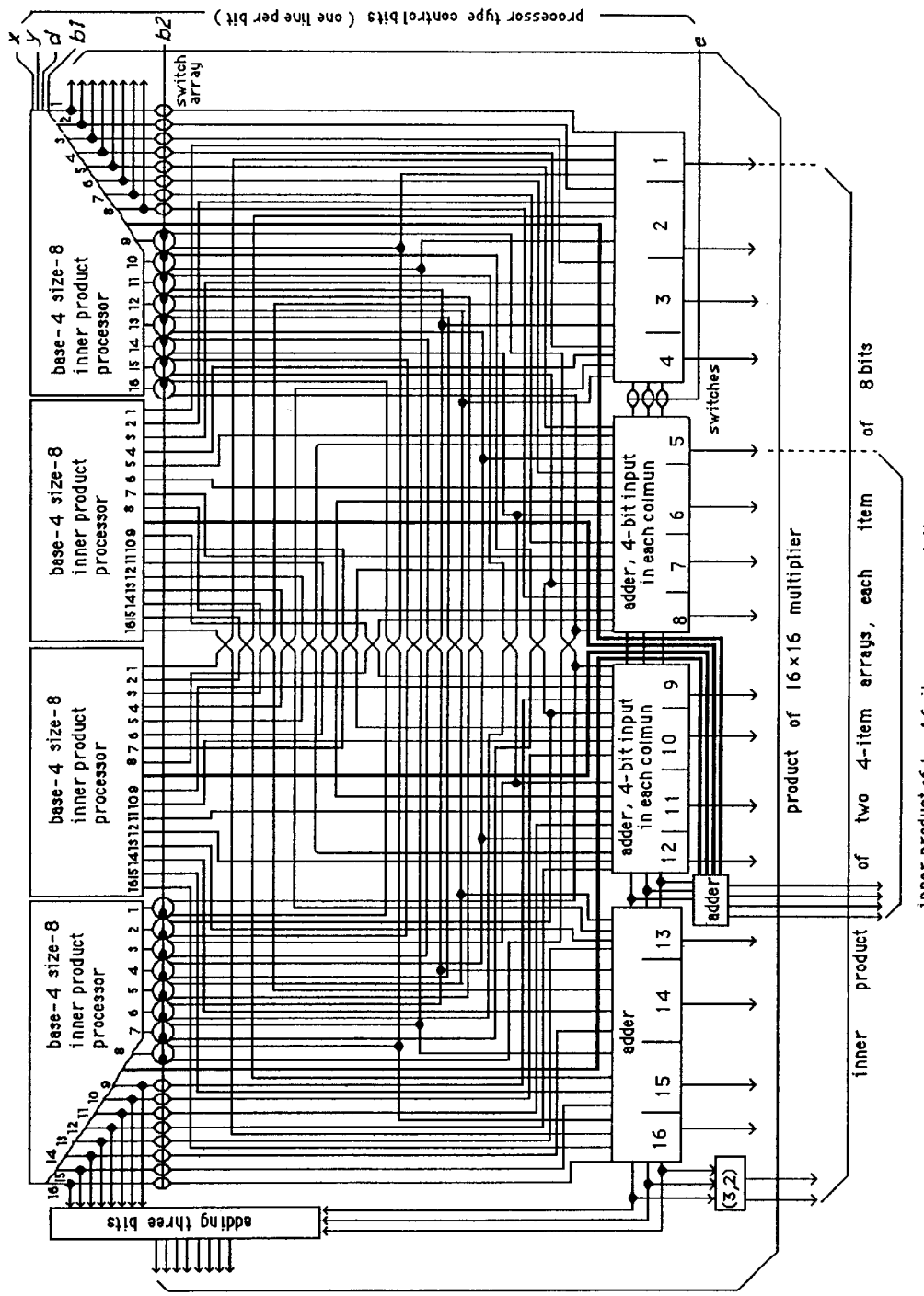
FIG. 18 illustrates a schematic view of a base-4, size-16 inner product processor, with the implementation of the second stage of the reconfiguration of the adder array.

The Simulations of the Inner Product Processors Referring to FIGS. 17 and 18, two inner product processors (base-4, size-8, and base-4, size-16 inner product processors), are shown. The processors have been partially simulated. Two stages of reconfiguration of adder arrays are illustrated in detail. The reconfigurable bit value settings for all input array options are listed in Table 2 (for FIG. 18, where the c bits are not shown), and in Table 3 (for FIG. 6), as depicted below:

high-speed and efficient matrix multiplication applications. SPICE simulations with a 0.25 $\mu$ process and a 2.5 V power supply have demonstrated the claimed performances of these inner product processors.

The inventive processor can also be easily used for other types of applications where parallel multiplications for several products are desired. For that purpose output lines and ports need be added to the corresponding adder arrays. On the other hand, the processor can also be extended to compute an inner product for input arrays with more items. For example, with two or four of the proposed processors available, the capability of the processor can be doubled or quadrupled for all types of input array structures by adding one larger final addition stage.

The base-8, size-64 inner product processor (as shown in FIGS. 6a through 6f) comprises the following levels of components: input placement/duplication network, input data fixed permutation network, base R-multiplier array, and three levels of adder arrays. Buffers can be easily added to achieve a 4-stage pipeline process. Stage 1 consists of data movement in a two input network; Stage 2 consists of operations of a base R-multiplier and a small (first-level) adder; Stages 3 and 4 consist of the additions with the adders in the last two levels, respectively. It is estimated that the operation in each stage can be finished in one or one half actual machine cycle.

TABLE 2

Reconfiguration Bit Values for a Base-4, Size-16 Inner Product Processor

| | control bit | | | | | | | | | | | | | | | | | | | | | |
|---|---|---|---|---|---|---|---|---|---|---|---|---|---|---|---|---|---|---|---|---|---|---|
| | 2's complement | | | | | | | | | | | unsigned | | | | | | | | | | |
| input option | x | y | d | b1 | b2 | b3 | e1 | e2 | e3 | c1 | c2 | c3 | x | y | d | b1 | b2 | b3 | e1 | e2 | e3 | c1 | c2 | c3 |
| 64-item of 8-bit | 0 | 0 | 1 | 0 | 0 | 0 | 1 | 1 | 1 | 0 | 0 | 0 | — | — | 0 | 0 | 0 | 0 | 1 | 1 | 1 | 0 | 0 | 0 |
| 16-item of 16-bit | 0 | 1 | 1 | 1 | 0 | 0 | 0 | 1 | 1 | 0 | 0 | 1 | — | — | 0 | 1 | 0 | 0 | 0 | 1 | 1 | 0 | 0 | 1 |
| 4 item of 32-bit | 1 | 0 | 1 | 1 | 1 | 0 | 0 | 0 | 1 | 0 | 1 | 1 | — | — | 0 | 1 | 1 | 0 | 0 | 0 | 1 | 0 | 1 | 1 |
| 1-item of 64-bit | 1 | 1 | 1 | 1 | 1 | 1 | 0 | 0 | 0 | 1 | 1 | 1 | — | — | 0 | 1 | 1 | 1 | 0 | 0 | 0 | 1 | 1 | 1 |

TABLE 3

Reconfiguration Bit Values for a Base-8, Size-64 Inner Product Processor

| | control bit | | | | | | | | | | |
|---|---|---|---|---|---|---|---|---|---|---|---|
| | 2's complement | | | | | | unsigned | | | | |
| input option | x | y | d | b1 | b2 | e | x | y | d | b1 | b2 | e |
| 16-item of 4-bit | 0 | 0 | 1 | 0 | 0 | 1 | — | — | 0 | 0 | 0 | 1 |
| 4 item of 8-bit | 0 | 1 | 1 | 1 | 0 | 0 | — | — | 0 | 1 | 0 | 0 |
| 1-item of 16-bit | 1 | 0 | 1 | 1 | 1 | 0 | — | — | 0 | 1 | 1 | 0 |

The processors require a compact VLSI area with very simple reconfigurable components. The total amount of hardware is comparable to corresponding array multipliers. The whole network is reconfigured using a few control bits, and the reconfiguration can be performed dynamically in one machine cycle. Also, each reconfiguration switch is controlled by a single bit. The design is highly regular and modular. Most parts of the network are symmetric and repeatable.

The processors can be pipelined to output an inner product in one machine cycle, and to complete an inner evaluation in two to four cycles. This is particularly attractive to Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A reconfigurable process for performing matrix multiplication based upon square recursive decomposition of partial product matrices and dynamic reconfiguration of basic multipliers and adders, said process steps comprising:
   a) providing an array of multipliers physically organized so that the output of said multipliers is grouped in a sequence of locations forming a local square;
   b) dynamically reconfiguring an input network which routes input from a set of fixed ports into a fixed permutation network in row-major and/or column-major order, according to a control input of an array of simple reconfigurable switches;
   c) recursively building from said local square an N×N bit multiplier by applying local processing recursively for larger calculations;

d) providing at least one array of adders, each said adder array comprising a right adder, adding four n-bit numbers and a left adder, adding a single (n/2)-bit number with three carry bits from the right adder;

e) dynamically reconfiguring an output network from said multiplier array to said adder array(s) to appropriately interpret products of said multipliers, according to a control input from an array of simple reconfigurable switches; and f) pipelining the output from the adder arrays.

2. The reconfigurable process for performing matrix multiplication in accordance with claim 1, using three levels of recursive construction (8–16 bit, 16–32 bit, 32–64 bit).

3. The reconfigurable process for performing matrix multiplication in accordance with claim 1, reconfiguring using fewer than four control bits.

4. The reconfigurable process for performing matrix multiplication in accordance with claim 3, reconfiguring dynamically in one machine cycle.

5. The reconfigurable process for performing matrix multiplication in accordance with claim 1, controlling a reconfiguration switch with a single bit.

6. The reconfigurable process for performing matrix multiplication in accordance with claim 1, pipelining an output from an inner product evaluation in one machine cycle.

7. The reconfigurable process for performing matrix multiplication in accordance with claim 1, completing an inner product evaluation in two to four machine cycles.

8. A reconfigurable process for performing matrix multiplication based upon square recursive decomposition of partial product matrix and dynamic reconfiguration of basic multipliers and adders, said process steps comprising:

a) using a regular, modular design having symmetric and repeatable components;

b) providing an array of multipliers physically organized so that the output of said multipliers is grouped in a sequence of locations forming a local square;

c) dynamically reconfiguring an input network which routes input from a set of fixed ports into a fixed permutation network in row-major and/or column-major order, according to a control input of an array of simple reconfigurable switches;

d) recursively building from said local square an N×N bit multiplier by applying local processing recursively for larger calculations;

e) providing at least one array of adders, each said adder array comprising a right adder, adding four n-bit numbers and a left adder, adding a single (n/2)-bit number with three carry bits from the right adder;

f) dynamically reconfiguring an output network from said multiplier array to said adder array(s) to appropriately interpret products of said multipliers, according to a control input from an array of simple reconfigurable switches; and g) pipelining the output from the adder arrays.

9. The reconfigurable process for performing matrix multiplication in accordance with claim 8, reconfiguring using fewer than four control bits.

10. The reconfigurable process for performing matrix multiplication in accordance with claim 9, reconfiguring in one machine cycle.

11. The reconfigurable process for performing matrix multiplication in accordance with claim 8, controlling a reconfiguration switch with a single bit.

12. The reconfigurable process for performing matrix multiplication in accordance with claim 8, pipelining an output from an inner product evaluation in one machine cycle.

13. The reconfigurable process for performing matrix multiplication in accordance with claim 8, completing an inner product evaluation in two to four machine cycles.

14. A reconfigurable process for performing matrix multiplication based upon square recursive decomposition of partial product matrices and dynamic reconfiguration of basic multipliers and adders, said process steps comprising:

a) using symmetric and repeatable components;

b) providing an array of multipliers physically organized so that the output of said multipliers is grouped in a sequence of locations forming a local square;

c) dynamically reconfiguring an input network which routes input from a set of fixed ports into a fixed permutation network in row-major and/or column-major order, according to a control input of an array of simple reconfigurable switches;

d) recursively building from said local square an N×N bit multiplier by applying local processing recursively for larger calculations;

e) providing at least one array of adders, each said adder array comprising a right adder, adding four n-bit numbers and a left adder, adding a single (n/2)-bit number with three carry bits from the right adder;

f) dynamically reconfiguring an output network from said multiplier array to said adder array(s) to appropriately interpret products of said multipliers, according to a control input from an array of simple reconfigurable switches; and g) pipelining the output from the adder arrays.

15. The reconfigurable process for performing matrix multiplication in accordance with claim 14, reconfiguring using fewer than four control bits.

16. The reconfigurable process for performing matrix multiplication in accordance with claim 14, reconfiguring dynamically in one machine cycle.

17. The reconfigurable process for performing matrix multiplication in accordance with claim 14, controlling a reconfiguration switch with a single bit.

* * * * *

UNITED STATES PATENT AND TRADEMARK OFFICE
CERTIFICATE OF CORRECTION

PATENT NO. : 6,718,465 B1
DATED : April 6, 2004
INVENTOR(S) : Rong Lin

It is certified that error appears in the above-identified patent and that said Letters Patent is hereby corrected as shown below:

<u>Column 1,</u>
Line 6, the following paragraph should be inserted:

-- ACKNOWLEDGEMENT OF GOVERNMENT SUPPORT
This invention was made in part with Government support under contract number MIP 9630870 awarded to the National Science Foundation. The Government has certain rights in the invention. --

Signed and Sealed this

Thirteenth Day of July, 2004

JON W. DUDAS
*Acting Director of the United States Patent and Trademark Office*